United States Patent Office

3,340,325
Patented Sept. 5, 1967

3,340,325
SINTERED POLYMERS
Leonard P. Suffredini, Santa Ana, Calif., assignor to Whittaker Corporation, a corporation of California
No Drawing. Filed May 10, 1963, Ser. No. 279,607
6 Claims. (Cl. 260—823)

The present invention relates to a process for forming or sintering high melting polymers and the products produced thereby. More particularly, the present invention relates to a process for sintering polymers such as polybenzimidazole to, in a preferred embodiment, produce homogeneous polybenzimidazole articles. This invention also includes the molding composition used in the sintering or forming process.

In general, sintering process for high melting polymers have relied primarily upon the application of extremely high pressures at high temperatures to accomplish an interdiffusion of powdered polymer to produce a coherent article. Furthermore, the polybenzimidazoles known to the prior art, e.g., that disclosed in U.S. Patent No. 2,895,948, are substantially infusible. Thus, if sintering of such substantially infusible polybenzimidazoles could be accomplished at all, pressures and temperatures of such great magnitude would be required as to render such a process substantially impractical and certainly commercially unfeasible.

Still further, it has been proposed that the powdered polymer which is to be sintered be combined with a binder which would promote cohesion of the sintered particles. However, this method has many serious deficiencies. Perhaps the most serious deficiency is the fact that such processes produce a two-phase heterogeneous product comprising the sintered particles and the binder. The binder phase is almost inevitably weaker than the sintered particle phase. This is particularly true at high temperatures because of the relatively low melting point of the binder. Thus, the presence of binders places severe and undesirable limitations on the strength characteristics of the sintered product. Furthermore, the presence of a binder is undesirable for end uses which requirer uniform properties, e.g., electical insulation in which dielectric strength could be adversely affected by a binder.

It is a principal object of the present invention to provide a molding composition, a process for sintering or forming high melting and substantially infusible polymers and the products so produced.

It is another object of the present invention to provide a prcoess for sintering or forming high melting and substantially infusible polymers which results in the production of a substantially homogeneous product and the product so produced.

It is a further object of the present invention to provide a process for sintering or forming high melting and substantially infusible polymers in which a prepolymer of the polymer to be sintered is used as a sintering aid and the product so produced.

It is still another object of the present invention to provide a process for sintering or forming substantially infusible polybenzimidazoles in which polybenzimidazole prepolymers are used as sintering aids and the product so produced.

It is a still further object of the present invention to provide a process for sintering or forming substantially infusible polybenzimidazoles in which a polybenzimidazole prepolymer prepared by reacting a diphenyl ester of an aromatic dicarboxylic acid and an aromatic tetramine to a degree short of substantial infusibility is used as a sintering aid, and the product so produced.

Other objects and advantages of the present invention, it is believed, will be apparent from the following detailed description of specific embodiments thereof.

Briefly, the present invention comprises a process for sintering substantially infusible polymers in which a prepolymer is used as a sintering aid. In a preferred embodiment, the present invention comprises a process for sintering substantially infusible polybenzimidazoles in which a polybenzimidazole prepolymer prepared by reacting a diphenyl ester of an aromatic dicarboxylic acid with an aromatic tetraamine to a degree short of substantial infusibility is used as a sintering aid. Aromatic tetramines which may be used to producec this sintering aid include the bis-(ortho-diamino) aromatic compounds, e.g., 3,3'-diamino-benzidine. The diphenyl esters of aromatic dicarboxylic acids which may be used in the present invention preferably have the diphenyl esters either meta or para to each other because an ortho diester may lead to imide formation and hence interfere with the condensation reaction. A wide variety or diphenyl esters may be used in the present invention, e.g., the diphenyl esters of isophthalic, terephthalic and diphenic acids; diphenyl 3,5-pyridine dicarboxylates; diphenyl 3,5-furane dicarboxylate, diphenyl naphthalene - 1,6 - dicarboxylate and diphenyl pyrene-3,8-dicarboxylate. Thus, it will be apparent to those skilled in the art that single ring, multi-ring, fused ring and heterocyclic aromatic diphenyl esters may be used to produce the sintering aid used in the present invention.

In the most preferred embodiment of the present invention the substantially infusible polybenzimidazole which is sintered is prepared according to the same reaction as that used to prepare the prepolymer sintering aid with the exception that the substantially infusible polymer is, of course, reacted to a degree such that it is substantially infusible.

In general, the polymerization of the polybenzimidazole prepolymer sinterng aid is performed such that the prepolymer is fusible at temperatures in the range of from about 200° F. to about 500° F. However, the degree of polymerization will depend upon the particular properties desired in the sintering aid and the sintered product and may vary somewhat from the preferred range. In any event, only routine experimentation would be required to determine the degree of polymerization desirable for a given use. This polymerization reaction will usually involve the evolution of water and phenol as volatile byproducts. Thus, further polymerization of the prepolymer sintering aid will generally result in the evolution of some water and phenol.

It is preferred that the substantially infusible polybenzimidazoles which are sintered according to the present invention have a melting point in excess of about 1,500° F. Such polymers may be prepared by reacting stoichiometric quantities of the reactants to completion at temperatures in the range of about 700° F. However, as in the case of the prepolymer sintering aid, the properties of the substantially infusible polymer may be varied to suit it for a particular use.

The present invention also includes molding composition used in and the products produced by the process of the present invention. This invention is further illustrated by the following example.

*Example*

A polybenzimidazole prepolymer was prepared by reacting stoichiometric ratios of diphenylisophthalate and 3,3'-diaminobenzidine in a nitrogen purged flask placed in a 200° C. bath while maintaining a very slight positive nitrogen pressure. This reaction was allowed to proceed until a prepolymer having a melting point of about 150° C.

was obtained. This prepolymer was then ground such that it would pass an 80 mesh screen.

A portion of the ground material was then heated in a vacuum oven at temperatures starting at 120° C. and gradually raised to 400° C. such that fusion of the ground material was prevented. The resulting product was a cured substantially infusible polymer.

The cured polymer was then combined with 10% by weight of the ground prepolymer and blended to give a uniform mixture of prepolymer in cured polymer. This mixture was then preheated to 120° C. and charged into a mold heated to the same temperature. The charge was then rapidly heated to 400° C. under a constant pressure of 6,000 p.s.i. After reaching temperature, the charge was maintained at 400° C. for three hours, cooled under pressure to less than 200° C. and removed from the mold.

The resulting product is a molded or sintered body which comprised a homogeneous substantially infusible polybenzimidazole. Thus, this product was comparable to that which would be produced by a conventional sintering of the substantially infusible polybenzimidazole under extremely high pressures and temperatures.

The proportion of prepolymer to polymer which may be used in the present invention depends upon several interacting variable including the chemical composition of the polymer, the size and shape of the polymer and the prepolymer particles, the melting point of the prepolymer, the pressure used in molding, the temperature used in molding, the cure time and the complexity of the part being molded. In general, the finer the particle size of the polymer, the greater the proportion of prepolymer required of a given mesh size. Furthermore, lower melting prepolymers permit the use of lower molding pressures and temperatures. In general, when polybenzimidazole is used as the substantially infusible polymer and the prepolymer sintering aid, about 5 to about 20% by weight of the prepolymer should be used. In this regard, it should be noted that a high prepolymer content will cause the sintering aid to generate a relatively large amount of volatiles which have a tendency to cause undesirable voids in the resulting product. The melting point of the prepolymer and the prepolymer content will, of course, define the cure pressure required to minimize the effect of the volatiles which are evolved. However, given the concept of the present invention, only routine experimentation is required to derive the process conditions which should be used. For example, when the preferred maximum amount of polybenzimidazole prepolymer, i.e., 20%, and the preferred lowest melting prepolymer, i.e., that which melts at about 200° F., are used, a very mild curing pressure of 500 p.s.i. may be used to produce articles having simple configurations. In general, the prepolymer sintering aid should be allowed to react to 99% completion during the curing step. For a polybenzimidazole prepared by the reaction of diphenylisophthalate and diaminobenzidine, a temperature of at least about 700° F. should be maintained for at least about three hours to achieve this result.

Among the advantages resulting from the practice of the process of this invention are that substantially infusible polymers can be processed into shaped articles with less vigorous processing conditions than those which would be required in a conventional sintering process and the elimination of the detrimental effects characteristic of conventional binders. Unlike conventional binders, the prepolymer sintering aid of the present invention maintains the melting point of the original cured substantially infusible polymer, substantially precludes the introduction of thermal stresses tending to reduce mechanical strength and does not depend upon diffusion processes which are difficult to control to insure part integrity. In a sense, the substantially infusible polymer particles could be considered to be bonded together rather than sintered.

Although the present invention has been described with particular reference to polybenzimidazoles, it will be readily apparent to those skilled in the art that the present invention may be modified in various ways without departing from the scope thereof. For example, other polymers which tend to produce substantially infusible products and which can be reacted to produce prepolymers which are substantially fusible could be used in the practice in the present invention.

Having fully described the present invention, it is to be understood that it is not to be limited to the specific embodiments set forth, but is of the full scope of the appended claims.

I claim:
1. A process for producing shaped articles comprising preparing a mixture of a polybenzimidazole having a melting point greater than about 1500° F. and a polybenzimidazole prepolymer having a melting point in the range of about 200° F. to about 500° F., said prepolymer comprising about 5 to about 20% by weight of said mixture, said mixture comprising particulate material, introducing said mixture into a mold, applying sufficient heat and pressure to cause prepolymer to become fluid and maintaining said mixture under sufficient heat and pressure to cure said prepolymer.

2. The process of claim 1 wherein said prepolymer has been prepared by reacting a diphenyl ester of an aromatic dicarboxylic acid and an aromatic tetramine to a degree short of substantial infusibility.

3. The process of claim 2 wherein said ester is diphenylisophthalate and said tetramine is 3,3'-diaminobenzidine.

4. A molding composition comprising a polybenzimidazole polymer having a melting point greater than about 1500° F. and a polybenzimidazole prepolymer having a melting point in the range of about 200 to about 500° F., said polymer and said prepolymer being in particulate form and having substantially the same chemical composition, said prepolymer comprising about 5 to about 20% by weight of said mixture.

5. The composition of claim 4 wherein said prepolymer has been prepared by reacting a diphenyl ester of an aromatic dicarboxylic acid and an aromatic tetramine to a degree short of substantial infusibility.

6. The composition of claim 5 wherein said ester is diphenylisophthalate and said tetramine is 3,3'-diaminobenzidine.

References Cited
UNITED STATES PATENTS 1,996,757    4/1935    Elbel _____ 260—838

OTHER REFERENCES

Journal of Polymer Science, vol. 50, pp. 511–513, 518–528 and 532, April 1961.

MURRAY TILLMAN, Primary Examiner.

E. B. WOODRUFF, D. J. BREZNER,
Assistant Examiners.